US012625072B2

(12) United States Patent
Aoyama et al.

(10) Patent No.: US 12,625,072 B2
(45) Date of Patent: May 12, 2026

(54) METHOD FOR INSPECTING SHAPED PRODUCT, AND METHOD FOR MANUFACTURING SHAPED PRODUCT

(71) Applicant: DAIKIN INDUSTRIES, LTD., Osaka (JP)

(72) Inventors: Takahisa Aoyama, Osaka (JP); Hayato Tsuda, Osaka (JP); Yuuki Kuwajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/487,453

(22) Filed: Sep. 28, 2021

(65) Prior Publication Data

US 2022/0018763 A1    Jan. 20, 2022

Related U.S. Application Data

(63) Continuation of application No. PCT/JP2020/014112, filed on Mar. 27, 2020.

(30) Foreign Application Priority Data

Mar. 29, 2019    (JP) ................................. 2019-066862

(51) Int. Cl.
*G01N 21/45*        (2006.01)
*B29C 45/00*        (2006.01)
        (Continued)

(52) U.S. Cl.
CPC ......... *G01N 21/45* (2013.01); *B29C 45/0001* (2013.01); *B29C 45/76* (2013.01);
        (Continued)

(58) Field of Classification Search
None
See application file for complete search history.

(56) References Cited

U.S. PATENT DOCUMENTS 2,908,818 A * 10/1959 Smith ................ G01N 21/3504
                                                      96/417
3,279,938 A * 10/1966 Schneeberger .......... G02B 5/22
                                                      359/359
(Continued)

FOREIGN PATENT DOCUMENTS

CN        1595254 A  *  3/2005  ........... G02B 6/0068
CN    106338522 A  *  1/2017  ............. G01N 21/89
        (Continued)

OTHER PUBLICATIONS

Chen (Ultrawide-field parallel spectral domain optical coherence tomography for nondestructive inspection of glass) (Year: 2015).*
(Continued)

*Primary Examiner* — Rufus L Phillips
(74) *Attorney, Agent, or Firm* — Sughrue Mion, PLLC

(57)        ABSTRACT

A method for inspecting a molded article, the method enabling non-destructive inspection of an internal condition of a molded article containing fluorine, and a method for producing a molded article including the inspection method. The method for inspecting a molded article includes a step (A1) of inspecting an internal condition of a molded article having a fluorine content of 30% by mass or more based on image data obtained by imaging the molded article by optical coherence tomography.

10 Claims, 12 Drawing Sheets

(51) Int. Cl.
B29C 45/76 (2006.01)
G01N 21/88 (2006.01)
G01N 21/95 (2006.01)

(52) U.S. Cl.
CPC ....... B29C 45/768 (2013.01); G01N 21/8806 (2013.01); G01N 21/8851 (2013.01); G01N 21/95 (2013.01); B29C 2945/7629 (2013.01); B29C 2945/76461 (2013.01); G01N 2021/8854 (2013.01)

(56) References Cited

U.S. PATENT DOCUMENTS

| | | | | |
|---|---|---|---|---|
| 4,955,719 | A * | 9/1990 | Hayes | G01B 9/02057 |
| | | | | 359/888 |
| 5,568,267 | A * | 10/1996 | Sunamori | G01N 21/8483 |
| | | | | 356/416 |
| 5,932,818 | A * | 8/1999 | Novick | G01N 21/3504 |
| | | | | 73/864.81 |
| 6,186,649 | B1 * | 2/2001 | Zou | F21V 7/005 |
| | | | | 362/217.1 |
| 6,416,840 | B1 * | 7/2002 | Miyamori | C08K 7/02 |
| | | | | 524/544 |
| 6,555,828 | B1 * | 4/2003 | Bokor | G03F 1/60 |
| | | | | 250/492.1 |
| 6,597,287 | B1 * | 7/2003 | Steinel | G08B 13/19 |
| | | | | 340/567 |
| 8,050,486 | B2 * | 11/2011 | Walton | G01N 21/88 |
| | | | | 382/141 |
| 2005/0058450 | A1 * | 3/2005 | Yamamoto | H05B 45/22 |
| | | | | 398/25 |
| 2005/0156343 | A1 * | 7/2005 | Cochran | B29C 45/7686 |
| | | | | 425/169 |
| 2006/0266958 | A1 * | 11/2006 | Shimizu | G01N 33/54373 |
| | | | | 250/583 |
| 2007/0165210 | A1 * | 7/2007 | Wang | G01J 3/02 |
| | | | | 356/73 |
| 2007/0281166 | A1 | 12/2007 | Nishio | |
| 2009/0240138 | A1 * | 9/2009 | Yi | A61B 5/0073 |
| | | | | 600/425 |
| 2010/0210952 | A1 | 8/2010 | Taira et al. | |
| 2011/0240886 | A1 * | 10/2011 | Tokhtuev | G01J 1/0411 |
| | | | | 250/573 |
| 2013/0128264 | A1 * | 5/2013 | Wax | G01B 9/02022 |
| | | | | 356/300 |
| 2013/0135614 | A1 * | 5/2013 | Wax | G01J 3/453 |
| | | | | 356/451 |
| 2013/0253884 | A1 * | 9/2013 | Aizenberg | A61B 3/102 |
| | | | | 702/167 |
| 2014/0378562 | A1 * | 12/2014 | Cervellati | B29C 45/0001 |
| | | | | 525/194 |
| 2015/0228069 | A1 * | 8/2015 | Fresquet | G01N 21/9501 |
| | | | | 348/87 |

| | | | | |
|---|---|---|---|---|
| 2015/0254828 | A1 * | 9/2015 | Beach | G01N 21/952 |
| | | | | 382/141 |
| 2016/0047746 | A1 * | 2/2016 | Tokhtuev | G01N 21/6486 |
| | | | | 250/226 |
| 2016/0214299 | A1 * | 7/2016 | Hayano | B29C 45/768 |
| 2018/0017499 | A1 | 1/2018 | Monchalin et al. | |
| 2018/0017503 | A1 * | 1/2018 | Fukui | G01N 21/4738 |
| 2019/0055390 | A1 * | 2/2019 | Sato | C08L 27/12 |
| 2019/0377114 | A1 * | 12/2019 | Wheatley | G02B 5/045 |
| 2020/0363531 | A1 * | 11/2020 | Buys | H05B 47/13 |
| 2021/0293710 | A1 * | 9/2021 | Byhmer | G01N 21/7703 |
| 2022/0021813 | A1 * | 1/2022 | Obara | G01N 21/8806 |

FOREIGN PATENT DOCUMENTS

| | | | | | |
|---|---|---|---|---|---|
| CN | 108827172 | A | * | 11/2018 | G01B 11/06 |
| CN | 109632095 | A | * | 4/2019 | G01J 1/50 |
| JP | 2006-145559 | A | | 6/2006 | |
| JP | 2007-320267 | A | | 12/2007 | |
| JP | 2009-270879 | A | | 11/2009 | |
| JP | 2012068620 | A5 | * | 9/2014 | |
| JP | 2015-174909 | A | | 10/2015 | |
| JP | 2018-132324 | A | | 8/2018 | |
| KR | 20160149429 | A | * | 12/2016 | |
| WO | WO-2004051215 | A2 | * | 6/2004 | G01N 21/4795 |
| WO | WO-2006050320 | A2 | * | 5/2006 | A61B 5/0066 |
| WO | 2018/072009 | A1 | | 4/2018 | |

OTHER PUBLICATIONS

Graf (Parallel frequency-domain optical coherence tomography scatter-mode imaging of the hamster cheek pouch using a thermal light source) (Year: 2008).*
Schouten (Underwater deployment of the ) (Year: 2012).*
De Castro, Alberto, et al. "Off-axis optical coherence tomography imaging of the crystalline lens to reconstruct the gradient refractive index using optical methods." Biomedical optics express 10.7 (2019): 3622-3634. (Year: 2019).*
Schouten (Underwater deployment of the polyphenylene oxide dosimeter combined with a neutral density filter) (Year: 2012).*
International Search Report for PCT/JP2020/014112, dated Jun. 30, 2020.
Bo Dong et al., "Microdefect identification in polymers by mapping depth-resolved phase-difference distributions using optical coherence tomography", Polymer Testing, 2018, vol. 68, pp. 233-237 (5 pages total).
Extended European Search Report issued Nov. 14, 2022 in European Application No. 20783864.0.
International Preliminary Report on Patentability dated Sep. 28, 2021 with a Translation of the Written Opinion of the International Searching Authority in Application No. PCT/JP2020/014112.
Shao Yong-hong, et al., "Research of a Novel Method to Inspecting Engineering Polymer", Laser & Infrared, Sep. 2006, vol. 36, No. 9 (7 pages total).

* cited by examiner

FIG.3
(a)
FIG.3
(b)
FIG.3
(c)
FIG.3
(d)
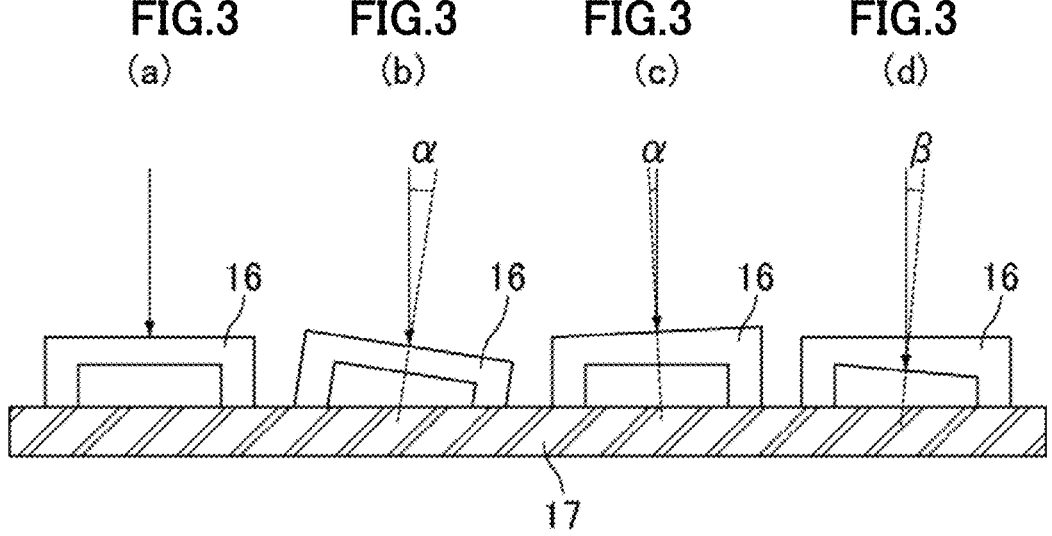
FIG.4
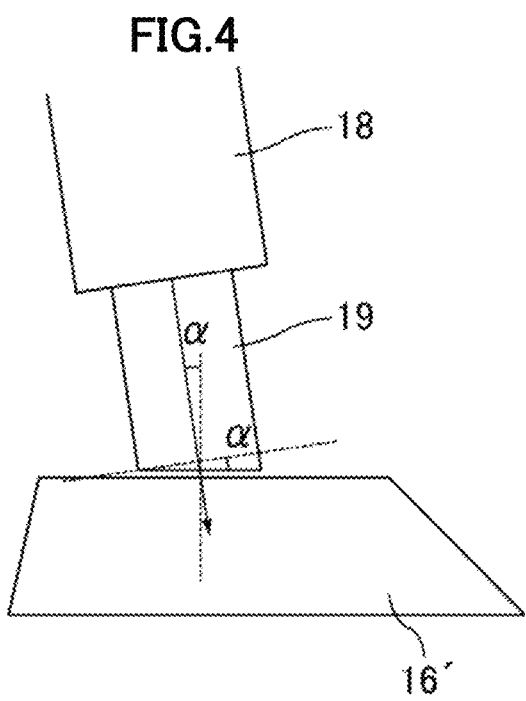

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

Horizontal position (X axis) / mm

METHOD FOR INSPECTING SHAPED PRODUCT, AND METHOD FOR MANUFACTURING SHAPED PRODUCT

CROSS REFERENCE TO RELATED APPLICATIONS

This application is a Rule 53(b) Continuation of International Application No. PCT/JP2020/014112 filed Mar. 27, 2020, claiming priority based on Japanese Patent Application No. 2019-066862 filed Mar. 29, 2019, the respective disclosures of which are incorporated herein by reference in their entirety.

TECHNICAL FIELD

The disclosure relates to methods for inspecting a molded article and methods for producing a molded article.

BACKGROUND ART

Fluororesin is excellent in properties such as heat resistance, abrasion resistance, and chemical resistance and is widely used, as one of representative engineering plastics, for products such as molded articles.

Patent Literature 1 discloses a specific method for ultrasonically inspecting an object to be inspected made from a fluororesin.

CITATION LIST

Patent Literature

Patent Literature 1: JP 2006-145559 A

SUMMARY

The disclosure relates to a method for inspecting a molded article, including a step (A1) of inspecting an internal condition of a molded article having a fluorine content of 30% by mass or more based on image data obtained by imaging the molded article by optical coherence tomography.

Advantageous Effects

The disclosure can provide a novel method for inspecting a molded article, the method enabling non-destructive inspection of an internal condition of a molded article containing fluorine, and a method for producing a molded article including the inspection method.

BRIEF DESCRIPTION OF DRAWINGS

FIG. 1 is a schematic view of an example of an optical coherence tomography (OCT) device that may be used in the inspection method of the disclosure.

FIG. 2 is an enlarged view of an OCT device that may be used in the inspection method of the disclosure, showing an example of an embodiment in which a sample is placed with an inclination.

FIGS. 3(*a*)-3(*d*) are schematic views of examples of the shape of a molded article that may be used in the inspection method of the disclosure.

FIG. 4 is a schematic view of an OCT device that may be used in the inspection method of the disclosure, showing an example of an embodiment in which a spacer is used to adjust the incident angle of light.

DESCRIPTION OF EMBODIMENTS

Figure 5:
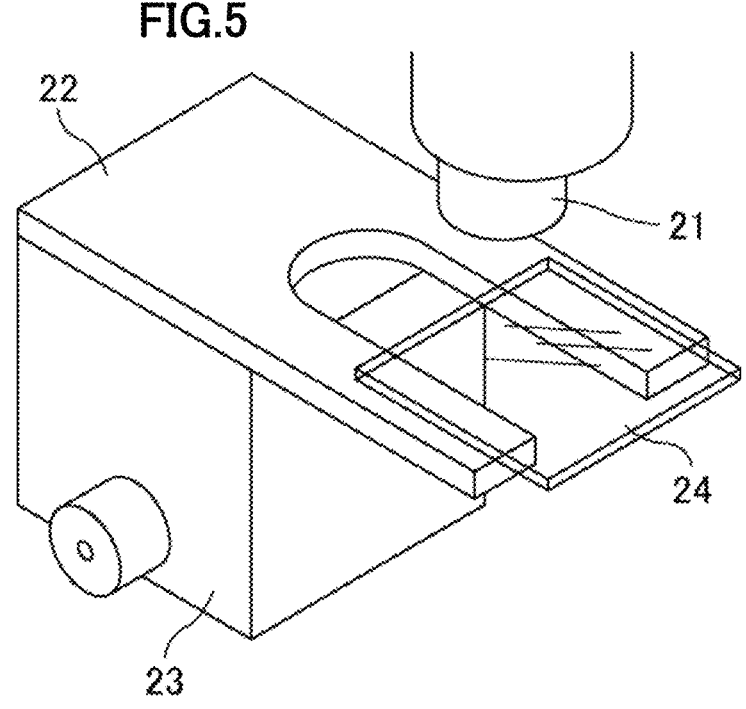
FIG. 5 is a schematic view of arrangement of a sample in OCT in the examples.

The disclosure is described in detail below.

The disclosure relates to a method for inspecting a molded article, including a step (A1) of inspecting an internal condition of a molded article having a fluorine content of 30% by mass or more based on image data obtained by imaging the molded article by the optical coherence tomography (OCT).

The inspection method of the disclosure enables non-destructive inspection of an internal condition of a molded article, and thus enables inspection of all molded articles. This can therefore improve the reliability of the quality of molded articles.

In addition, OCT imaging can be performed at high speed, and thus the above inspection method can be easily integrated into a production line of molded articles. This can therefore improve the reliability of the quality of molded articles without impairing the productivity in the production line.

The molded article to be inspected in the step (A1) has a fluorine content of 30% by mass or more. The fluorine content is preferably 41% by mass or more, more preferably 59% by mass or more, while preferably 76% by mass or less.

The fluorine content is determined by burning 10 mg of a sample by an oxygen flask combustion method, causing the decomposition gas to be absorbed by 20 ml of deionized water, and measuring the fluoride ion concentration in the absorption liquid by a fluorine selective electrode method.

The molded article at least contains a material containing a fluorine atom, and is preferably a molded article of a polymer.

The molded article preferably contains a fluorine-containing polymer. Examples of the fluorine-containing polymer include a polymer containing a fluorine atom, such as fluororesin and fluororubber. Preferred among these is fluororesin.

The fluororesin preferably has a melting point of 100° C. to 360° C., more preferably 150° C. to 340° C., still more preferably 180° C. to 330° C., particularly preferably 200° C. to 320° C.

The melting point is the temperature corresponding to the maximum value on a heat-of-fusion curve obtained by increasing the temperature at a rate of 10° C./min using a differential scanning calorimeter (DSC).

Examples of the fluororesin include polytetrafluoroethylene (PTFE), a tetrafluoroethylene (TFE)/perfluoro(alkyl vinyl ether) (PAVE) copolymer (PFA), a TFE/hexafluoropropylene (HFP) copolymer (FEP), an ethylene (Et)/TFE copolymer (ETFE), an Et/TFE/HFP copolymer (EFEP), polychlorotrifluoroethylene (PCTFE), a chlorotrifluoroethylene (CTFE)/TFE copolymer, an Et/CTFE copolymer, polyvinylidene fluoride (PVDF), polyvinyl fluoride (PVF), a vinylidene fluoride (VdF)/TFE copolymer, a VdF/HFP copolymer, a VdF/TFE/HFP copolymer, a VdF/HFP/(meta) acrylic acid copolymer, a VdF/CTFE copolymer, a VdF/pentafluoropropylene copolymer, and a VdF/PAVE/TFE copolymer.

In particular, the fluororesin is preferably a melt-fabricable fluororesin. The term "melt-fabricable" means that a polymer can be melted and processed using a conventional processing device such as an injection molding machine. The melt-fabricable fluororesin usually has a melt flow rate (MFR) of 0.01 to 500 g/10 min.

In the description, the MFR is a value obtained by measurement at a temperature of 372° C. and a load of 5 kg in conformity with ASTM D 1238.

The melt-fabricable fluororesin preferably includes at least one selected from the group consisting of PFA, FEP, ETFE, EFEP, PCTFE, a CTFE/TFE copolymer, an Et/CTFE copolymer, PVDF, and PVF, more preferably at least one selected from the group consisting of PFA, FEP, ETFE, EFEP, PCTFE, a CTFE/TFE copolymer, an Et/CTFE copolymer, and PVDF, still more preferably at least one selected from the group consisting of PFA and FEP. Particularly preferred is PFA because it can be easily injection-molded.

Examples of the PAVE in the PFA include those represented by the following formula (1):

$$CF_2=CF-ORf \qquad (1)$$

wherein Rf is a C1-C10, preferably C1-C5 perfluoroalkyl group. Preferred among these are perfluoro(methyl vinyl ether) (PMVE), perfluoro(ethyl vinyl ether) (PEVE), and perfluoro(propyl vinyl ether) (PPVE).

The PFA is preferably, but is not limited to, a copolymer having a ratio by mole of a TFE unit and a PAVE unit (TFE unit/PAVE unit) of 70/30 or higher and lower than 99.5/0.5. The ratio by mole is more preferably 70/30 or higher and 98.9/1.1 or lower, still more preferably 80/20 or higher and 98.5/1.5 or lower. Too small an amount of the TFE unit tends to cause poor mechanical properties, while too large an amount thereof tends to cause too high a melting point and poor moldability. The PFA may be a copolymer consisting of TFE and PAVE, or may be a copolymer containing a monomer unit derived from a monomer copolymerizable with TFE and PAVE in an amount of 0.1 to 10 mol % as well as a TFE unit and a PAVE unit in a total amount of 90 to 99.9 mol %. Examples of the monomer copolymerizable with TFE and PAVE include HFP, a vinyl monomer represented by $CZ^1Z^2=CZ^3(CF_2)nZ^4$ (wherein $Z^1$, $Z^2$, and $Z^3$ are the same as or different from each other, and are each a hydrogen atom or a fluorine atom; $Z^4$ is a hydrogen atom, a fluorine atom, or a chlorine atom; and n is an integer of 2 to 10), and an alkyl perfluorovinyl ether derivative represented by $CF_2=CF-OCH_2-Rf^1$ (wherein $Rf^1$ is a C1-C5 perfluoroalkyl group).

The PFA preferably has a melting point of 180° C. to 340° C., more preferably 230° C. to 330° C., still more preferably 280° C. to 320° C. The melting point is the temperature corresponding to the maximum value on a heat-of-fusion curve obtained by increasing the temperature at a rate of 10° C./min using a differential scanning calorimeter (DSC).

The PFA preferably has a melt flow rate (MFR) of 0.1 to 100 g/10 minutes, more preferably 0.5 to 90 g/10 minutes, still more preferably 1.0 to 85 g/10 minutes.

The FEP is preferably, but is not limited to, a copolymer having a ratio by mole of a TFE unit and a HFP unit (TFE unit/HFP unit) of 70/30 or higher and lower than 99/1. The ratio by mole is more preferably 70/30 or higher and 98.9/1.1 or lower, still more preferably 80/20 or higher and 97/3 or lower. Too small an amount of the TFE unit tends to cause poor mechanical properties, while too large an amount thereof tends to cause too high a melting point and poor moldability. The FEP may be a copolymer containing a monomer unit derived from a monomer copolymerizable with TFE and HFP in an amount of 0.1 to 10 mol % as well as a TFE unit and a HFP unit in a total amount of 90 to 99.9 mol %. Examples of the monomer copolymerizable with TFE and HFP include PAVE and an alkyl perfluorovinyl ether derivative.

The FEP preferably has a melting point of 150° C. to 320° C., more preferably 200° C. to 300° C., still more preferably 240° C. to 280° C. The melting point is the temperature corresponding to the maximum value on a heat-of-fusion curve obtained by increasing the temperature at a rate of 10° C./min using a differential scanning calorimeter (DSC).

The FEP preferably has a melt flow rate (MFR) of 0.01 to 100 g/10 minutes, more preferably 0.1 to 80 g/10 minutes, still more preferably 1 to 60 g/10 minutes, particularly preferably 1 to 50 g/10 minutes.

In the description, the amounts of the respective monomer units constituting the fluororesin can be calculated by appropriate combination of NMR, FT-IR, elemental analysis, and X-ray fluorescence analysis in accordance with the types of the monomers.

The fluororubber is an amorphous fluoropolymer. The fluororubber usually has no clear melting point.

Examples of the fluororubber include vinylidene fluoride (VdF) fluororubber, tetrafluoroethylene (TFE)/propylene (Pr) fluororubber, TFE/Pr/VdF fluororubber, ethylene (Et)/hexafluoropropylene (HFP) fluororubber, Et/HFP/VdF fluororubber, Et/HFP/TFE fluororubber, perfluororubber, fluorosilicone fluororubber, and fluorophosphazene fluorrubber. Preferred among these is VdF fluororubber.

Examples of the VdF fluororubber include a VdF/HFP copolymer, a VdF/TFE/HFP copolymer, a VdF/chlorotrifluoroethylene (CTFE) copolymer, a VdF/CTFE/TFE copolymer, a VdF/perfluoro(alkyl vinyl ether) (PAVE) copolymer, a VdF/TFE/PAVE copolymer, a VdF/HFP/PAVE copolymer, a VdF/HFP/TFE/PAVE copolymer, a VdF/TFE/Pr copolymer, a VdF/Et/HFP copolymer, and a copolymer of VdF and a fluorine-containing monomer represented by the following formula (2):

$$CH_2=CFRf^2 \qquad (2)$$

wherein $Rf^2$ is a C1-C12 linear or branched fluoroalkyl group.

The fluororubber preferably has a Mooney viscosity at 100° C. of 2 to 200, more preferably 10 to 150, still more preferably 30 to 80.

The Mooney viscosity is measured in conformity with ASTM D1646 and JIS K6300.

The molded article may contain a different component as appropriate.

Examples of the different component include a fluorine-free polymer, a filler, a plasticizer, a pigment, a colorant, an antioxidant, an ultraviolet absorber, a flame retarder, an antistatic agent, and an antistatic agent.

Examples of the fluorine-free polymer include non-fluorine-based resins such as polyolefin resin, polyamide resin, polyester resin, polyacetal resin, polyether resin, polyamide-imide resin, and polysulfone resin; and non-fluorine-based rubbers such as styrene-butadiene rubber (SBR), chloroprene rubber (CR), butadiene rubber (BR), natural rubber (NR), isoprene rubber (IR), ethylene-propylene-termonomer copolymerized rubber, silicone rubber, butyl rubber, acrylic rubber, and ethylene-propylene-diene rubber (EPDM).

Examples of the filler include silica, kaolin, clay, organic clay, talc, mica, alumina, calcium carbonate, calcium terephthalate, titanium oxide, calcium phosphate, calcium fluoride, lithium fluoride, cross-linked polystyrene, potassium titanate, carbon, boron nitride, carbon nanotube, and glass fiber.

The different component is preferably contained in an amount of 30% by mass or less, more preferably 20% by mass or less, still more preferably 10% by mass or less, particularly preferably 5% by mass or less relative to the molded article.

The molded article also preferably consists of the fluorine-containing polymer.

The molded article can be produced by molding a material containing a fluorine atom (e.g., the fluorine-containing polymer) into a desired shape and size appropriately together with a different component.

The molding may be performed by any method such as compression molding, transfer molding, extrusion molding, injection molding, or calender molding.

From the viewpoint of productivity, extrusion molding or injection molding is preferred, and injection molding is more preferred.

In a preferred embodiment, the molded article is an injection-molded article. Injection-molded articles are likely to have defects such as delamination and cracking therein. The inspection method of the disclosure enables easy inspection of an internal condition of an injection-molded article that can be produced with excellent productivity.

The molded article may have a shape selected from a variety of shapes such as, but not limited to, a sheet shape, a film shape, a rod shape, and a pipe shape.

The molded article may have a shape having parallel front and back surfaces.

The molded article preferably has a thickness of 0.05 to 6 mm. The thickness is more preferably 3 mm or smaller, still more preferably 2 mm or smaller, while more preferably 0.1 mm or greater, still more preferably 0.2 mm or greater.

The molded article preferably has a near-infrared transmittance at a wavelength of 1350 nm of 60% or higher. The transmittance is more preferably 85% or higher, still more preferably 90% or higher.

The transmittance is a value obtained by selecting a larger value from a value obtained by direct measurement on the target molded article with a near-infrared spectroscopic analyzer and a value obtained by measurement on a sheet or film formed from the same material as that of the molded article with a near-infrared spectroscopic analyzer.

The molded article preferably has a single-layer structure. The single-layer structure means that the structure is not a multi-layer structure that is intentionally formed.

The inspection in the step (A1) is performed based on image data obtained by OCT imaging of the molded article. The inspection method of the disclosure may include a step of OCT imaging the molded article to obtain image data of the molded article.

OCT is classified into time domain OCT (TD-OCT) and Fourier domain OCT (FD-OCT), and FD-OCT is further classified into spectral domain OCT (SD-OCT) and swept source OCT (SS-OCT).

Any OCT may be used in the step (A1), and SS-OCT is preferred owing to its high sensitivity and deep measurable depth.

Examples of light used for OCT include visible light and infrared light, and near-infrared (NIR) light is preferred.

In many cases of inspecting a molded article of a polymer mainly composed of CF and CC bonds, light within almost the entire near-infrared wavelength range can be used. For a smaller crystal size, light on the long wavelength side of the visible region (600 nm or longer) and light on the short wavelength side of the infrared region (5000 nm or shorter) can also be used.

Preferred is light at a wavelength of 1000 to 2000 nm because an applicable OCT device is easily available. In particular, light having a center wavelength of $1100\pm50$ nm, $1320\pm50$, and $1750\pm100$ nm are more preferred in terms of light source stability and sensor reliability.

Figures 1, 2:
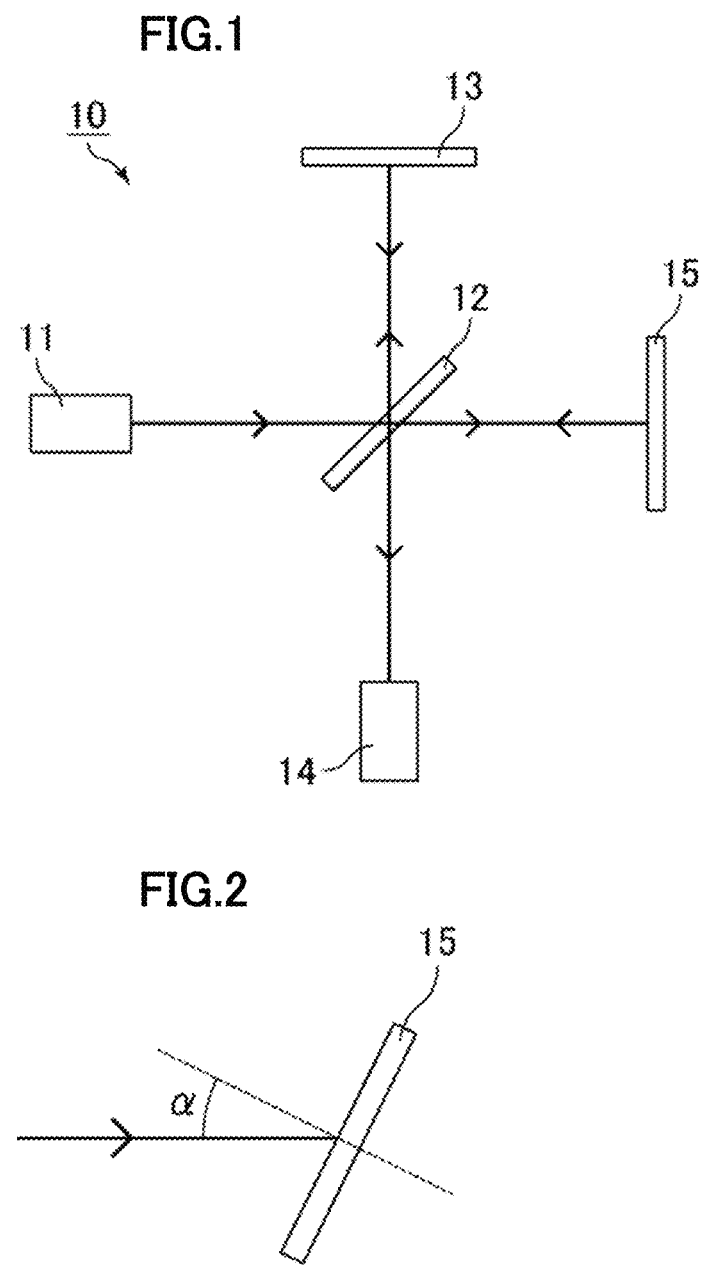

An example of a method of imaging the molded article using an OCT device is described with reference to FIG. 1.

In an OCT device 10, light emitted from a light source 11 is separated into two beams by a beam splitter 12. One beam is reflected on a reference mirror 13 and then incident on a photodetector 14 as reference light. The other beam is incident on a sample (molded article) 15, permeates into a certain depth, and is reflected on the surface of the sample 15 or an internal defect such as cracking or delamination. The light reflected on the sample 15 passes through the beam splitter 12 and is incident on the photodetector 14 as signal light. The photodetector 14 detects interference light generated by interference between the reference light and the signal light, converts the interference light into a signal, and outputs the signal. This output signal is imaged in accordance with characteristics such as intensity, which can provide an image showing the structure of the sample 15.

The OCT device and imaging method that can be used in the inspection method of the disclosure are not limited to those described above.

In the OCT imaging, the light from the light source of an OCT device preferably has an incident angle $\alpha$ of 3 to 30 degrees relative to the molded article. The incident angle $\alpha$ is more preferably 5 degrees or greater, still more preferably 7 degrees or greater, while more preferably 30 degrees or smaller, still more preferably 20 degrees or smaller, further more preferably 15 degrees or smaller, particularly preferably 10 degrees or smaller.

Setting the incident angle $\alpha$ within the above range can reduce noise in the image and can clarify a signal due to a defect of the molded article.

The above effects are significant when the molded article has a high near-infrared transmittance (especially when the molded article contains a fluororesin) and when the front surface (surface close to the OCT light source) and back surface (surface opposite to the front surface) to be inspected of the molded article are parallel to each other.

The incident angle $\alpha$ is defined as the angle formed by the incident direction of the light and a perpendicular to a surface of the molded article. The surface may be the surface close to the OCT light source.

FIG. 2 shows an example of an embodiment in which a sample is placed with an inclination. In FIG. 2, light is incident on the sample 15 at an incident angle $\alpha$.

The incident angle α can be adjusted, for example, by adjusting the inclination of a sample stage on which the molded article (sample) is placed.

Alternatively, for example, the molded article may be designed to have a shape such that a portion to be inspected deviates from the horizontal when placed on a horizontal surface, whereby the incident angle α can be set to fall within the above preferred range. FIGS. 3(*b*) and 3(*c*) show examples. Each molded article 16 is designed such that the surface to be inspected (the surface close to the OCT light source) of the molded article 16 is inclined relative to a horizontal table 17, and light from the OCT light source is incident thereon at an incident angle α. The shape of the molded article is not limited to these examples.

Any of the above adjustment methods may be used alone or in combination.

Alternatively, the incident angle α may be adjusted by providing a spacer between the probe and the molded article (sample). The spacer may be fixed to the probe.

Preferably, for example, the spacer is a tube that allows passage of light emitted from the probe and has an end inclined relative to the plane perpendicular to the traveling direction of the light (longitudinal direction of the tube). The tube may be a cylinder, for example. The inclined end is the end close to the molded article (opposite to the probe) of the spacer. The end of the spacer close to the probe may be formed perpendicular to the traveling direction of the light (longitudinal direction of the tube).

The incident angle relative to the molded article can be adjusted to an angle corresponding to the inclination by bringing the inclined end of the spacer into slight contact with the molded article and irradiating the molded article with light while the other end is in contact with or fixed to the probe.

FIG. 4 shows an example. A spacer 19 with one end being fixed to a probe 18 has an inclined end close to a molded article 16', and the inclination has an angle α relative to the plane perpendicular to the traveling direction of light (longitudinal direction of the spacer 19). Slightly pressing this end against the surface of the molded article 16' and irradiating the surface with light allow the light to be incident on the molded article 16' at an incident angle α.

Upon pressing the spacer against the molded article, the spacer (or probe) may be moved and pressed or the molded article may be moved and pressed, or both may be moved and pressed.

It is important that the end close to the molded article (sample) of the above spacer is provided with an inclination corresponding to a desired light incident angle. In this respect, the spacer is prepared by adding a completely novel function that cannot be expected from a conventional technique to a conventional spacer that is provided for preventing contact between a sample and a probe or controlling the distance between a sample and a probe.

Properties of the spacer such as the size, material, color can be determined in consideration of factors such as mechanical strength, damage to a molded article when pressed thereagainst, cost, and handleability.

Also preferably, an angle β formed by a perpendicular to the surface of the molded article opposite to the surface close to the OCT light source and the light is adjusted to 3 to 30 degrees. The angle β is more preferably 5 degrees or greater, still more preferably 7 degrees or greater, while more preferably 30 degrees or smaller, still more preferably 20 degrees or smaller, further more preferably 15 degrees or smaller, particularly preferably 10 degrees or smaller.

Setting the angle β within the above range can reduce noise in the image and can clarify a signal due to a defect of the molded article.

The above embodiment is particularly effective for the case where a portion to be inspected of the molded article has a plate shape.

For example, the angle β can be adjusted by designing the molded article to have a shape such that a portion to be inspected deviates from the horizontal when placed on a horizontal surface. FIG. 3(*d*) shows an example. The molded article 16 is designed such that the surface opposite to the surface close to the OCT light source is inclined relative to the horizontal table 17, and a perpendicular to this surface and light from the OCT light source forms an angle β. The shape of the molded article is not limited to this example.

The angle β can also be adjusted by adjusting the inclination of a sample stage on which the molded article is placed.

Any of the above adjustment methods may be used alone or in combination.

If one molded article has two or more portions to be inspected, a plurality of OCT optical systems may be prepared and the portions to be inspected may be subjected to measurement simultaneously or sequentially. In this case, the above embodiments are preferred because the incident angle α and the angle β can be adjusted to fall within the above respective preferred ranges even when the portions of the molded article to be inspected have different inclinations. The above embodiments are also preferred because the OCT device needs no change in the specifications even when the portions to be inspected are apart from each other. The above embodiments are also preferred because the incident angle α and the angle β can be adjusted correspondingly to the respective portions even when the portions of the molded article to be inspected form a large step therebetween.

In the OCT imaging, the light incident on the molded article preferably has an intensity of 1 mW to 18 mW. The intensity of the light is more preferably 5 mW or higher, still more preferably 10 mW or higher, while more preferably 15 mW or lower, still more preferably 12 mW or lower.

Setting the intensity of the light within the above range can reduce noise in the image and can clarify a signal due to a defect of the molded article.

The above effects are significant when the molded article has a high near-infrared transmittance (especially when the molded article contains a fluororesin) and when the front surface and back surface of the molded article are parallel to each other.

In the description, the intensity of light incident on the molded article is the intensity of light at a probe end of an OCT device when no filter to be described later is provided.

The intensity of light may be controlled to fall within the above range by providing a filter that reduces the intensity of light from the light source between the light source of an OCT device and the molded article.

The filter is preferably provided between the beam splitter of the OCT device and the molded article. Further, the filter is preferably provided at a position close to the beam splitter (for example, within 30 mm, preferably within 10 mm, from the beam splitter).

The filter to be used may be one having a material and structure that can reduce the intensity of light from the light source.

An example of the material of the filter may be a crystalline polymer. A crystalline polymer can scatter light and thus can reduce the intensity of light. Examples of the crystalline polymer include ethylenic polymers such as polyethylene (PE) (e.g., linear low-density polyethylene (LLPE), low-density polyethylene (LPE), high-density polyethylene (HDPE)) and an ethylene/vinyl acetate copolymer (EVA); polypropylene (PP); fluororesins such as polytetrafluoroethylene (PTFE) (e.g., TFE homopolymer, modified PTFE), a tetrafluoroethylene/perfluoro(alkyl vinyl ether) copolymer (PFA), and a tetrafluoroethylene/hexafluoropropylene copolymer (FEP); and polyesters such as polyethylene terephthalate (PET).

The material of the filter may also be a material that absorbs light, and an example thereof is a polymer containing an OH group or an aromatic ring.

In particular, the filter preferably contains a crystalline polymer because it can easily reduce multiple-reflection noise and clarify a signal, more preferably contains at least one selected from the group consisting of PE, PP, fluororesin, and PET, still more preferably contains at least one selected from the group consisting of PE and fluororesin, and further more preferably contains at least one selected from the group consisting of PE, PTFE, and PFA.

In particular, a filter containing PTFE is preferred because it can efficiently remove multiple-reflection noise while maintaining the resolution of a signal of a sample, and a filter containing modified PTFE is particularly preferred.

In the description, the modified PTFE is a PTFE containing a TFE unit and a modifying monomer unit based on a modifying monomer copolymerizable with TFE, preferably a PTFE containing 99.0 to 99.99999% by mass of a TFE unit and 0.00001 to 1.0% by mass of a modifying monomer unit relative to all monomer units.

The filter preferably has a thickness of 0.05 to 3 mm. The thickness is more preferably 2 mm or less, still more preferably 1 mm or less, while more preferably 0.08 mm or more, still more preferably 0.10 mm or more.

The filter may have a single-layer structure consisting of one layer or a multi-layer structure including a plurality of layers. A structure in which multiple layers are stacked is preferred because the balance between the signal and noise of a sample can be finely adjusted. Layers formed from the same material may be used, or layers formed from different materials and/or having different thicknesses may be used together. The layers need not to be in close contact with each other, and may be spaced as appropriate. Such spacing enables easy putting in and taking out of the individual layers, which therefore makes it easy to adjust the balance between the signal and noise of a sample.

When a portion to be inspected in the sample (molded article) is close to a sample stage, reflection of light passed through the sample on the stage may cause noise. Thus, the system is preferably devised so that the light passed through the sample does not affect the inspection.

For example, an object that reflects light passed through a sample may be apart from a portion to be inspected of the sample by 10 mm or more. In this case, preferably, a portion not to be inspected (e.g., both ends of the sample) is used to support the sample so that the portion to be inspected and the sample stage do not overlap.

Alternatively, light passed through a sample may be reflected in a direction not oriented to the probe.

Still alternatively, an object that absorbs or scatters almost the entire light passed through a sample may be placed at a position where this light hits.

The above techniques may be used in combination as appropriate.

In the step (A1), an internal condition of the molded article is inspected based on the image data.

The inspection may be performed using an image obtained from the image data or may be performed by processing the image data, or both may be used in combination.

The inspection is preferably inspection of a defect inside the molded article.

Examples of the defect include cracking, delamination, voids, and foreign substances. The defect may be caused by molding failure.

The inspection preferably determines the presence or absence of the defect.

The step (A1) is preferably a step of inspecting a defect inside the molded article based on the image data, more preferably a step of inspecting cracking and delamination inside the molded article based on the image data.

The inspection may be performed based on a signal due to a defect inside the molded article in the image data. Further, the presence or absence of a defect is preferably determined based on a signal due to the defect.

An example of a method for determining the presence or absence of a defect may be a method in which the cases where no signal due to any of the aforementioned defects is observed in the image obtained by the OCT are determined as the absence of a defect, while the cases where a signal due to at least one of the aforementioned defects is observed in the image are determined as the presence of a defect.

If the inspection determines the presence of a defect, the size, shape, appearance frequency, and other properties of the defect may be further analyzed. Such analysis enables easy determination of whether or not the above defect is a defect that causes the molded article to be determined as a defective product. The analysis may be performed, for example, by processing a signal due to the defect.

The inspection method of the disclosure may further include a step (A2) of determining whether the molded article is a good product or not based on a result of the inspection in the step (A1).

For example, the step (A2) may be a step of determining a molded article as a good product when the molded article has been determined as having no defect in the step (A1), while determining a molded article as a defective product when the molded article has been determined as having a defect in the step (A1).

Alternatively, the step (A2) may be a step of determining, as good products, a molded article that has been determined as having no defect in the step (A1) and a molded article that has been determined as having a defect in the step (A1) and that has a defect whose degree is not higher than a predetermined standard, while determining, as a defective product, a molded article having a defect whose degree is higher than the predetermined standard among the molded articles that have been determined as having a defect in the step (A1).

The standard for the degree of a defect may be determined as appropriate with no limitation in accordance with, for example, the required characteristics of the molded article. For example, the standard may be determined by obtaining in advance a correlation between the properties such as the size, shape, and appearance frequency of a defect in a molded article and the pass/fail data in a practical test where the molded article is used as a part, and then experimentally determining, for example, allowable ranges of the properties such as the size, shape, and appearance frequency of the defect that do not cause the molded article to be determined as a defective product.

The inspection method of the disclosure enables easy inspection of an internal condition of a molded article, and thus is useful for adjusting the molding conditions, for example. In addition, the inspection method of the disclosure enables non-destructive inspection of an internal condition of a molded article at high speed, and thus can be used for applications such as sorting of good products and defective products in production of molded articles and acceptance inspection of molded articles.

The disclosure also relates to a method for producing a molded article including:

a step (B1) of molding a material containing a fluorine atom to provide a plurality of molded articles each having a fluorine content of 30% by mass or more;

a step (B2) of selecting at least one molded article from the plurality of molded articles and inspecting an internal condition of the selected molded article based on image data obtained by imaging the selected molded article by optical coherence tomography; and a step (B3) of sorting a good product from the plurality of molded articles based on a result of the inspection in the step (B2).

The production method of the disclosure enables non-destructive inspection of an internal condition of molded articles, and thus enables inspection of all molded articles for sorting of good molded articles. This can therefore improve the reliability of the quality of molded articles.

In addition, OCT imaging can be performed at high speed, and thus the step (B2) can be easily integrated into a production line of molded articles. This can therefore improve the reliability of the quality of molded articles without impairing the productivity in the production line.

In the step (B1), a material containing a fluorine atom is molded to provide a plurality of molded articles each having a fluorine content of 30% by mass or more.

Each molded article in the step (B1) is the same as the molded article in the step (A1) of the inspection method of the disclosure. Examples of the material containing a fluorine atom include those described as materials that can form the molded article in the step (A1).

An example of the method of molding the material containing a fluorine atom may be the same as the molding method for the molded article in the step (A1).

In the step (B2), at least one molded article is selected from the plurality of molded articles provided in the step (B1), and an internal condition of each of the selected molded articles is inspected based on image data obtained by OCT imaging the selected molded articles. The production method of the disclosure may include a step of OCT imaging the molded articles to provide image data based on the molded articles.

In the step (B2), one molded article may be selected or two or more molded articles may be selected. Since the inspection in the step (B2) can be performed non-destructively, selecting two or more molded articles is preferred, selecting not less than half of the molded articles obtained in the step (B1) is more preferred, and selecting all of the molded articles obtained in the step (B1) is still more preferred.

In the step (B2), the OCT imaging method and the inspection method (for example, a method of determining the presence or absence of a defect) used may be the same as those described for the step (A1) in the inspection method of the disclosure.

In the step (B3), a good product is sorted from the plurality of molded articles provided in the step (B1) based on a result of the inspection in the step (B2). The good molded article sorted in the step (B3) corresponds to the molded article produced by the production method of the disclosure.

The step (B3) may include a step (B3-1) of determining whether the molded article inspected in the step (B2) is a good product or not based on the result of the inspection in the step (B2) and a step (B3-2) of sorting a molded article determined as a good product in the step (B3-1) from the plurality of molded articles provided in the step (B1).

The same determination method as described for the step (A2) may be used in the step (B3-1).

The sorting in the step (B3-2) may be performed by any method.

The steps (B1) to (B3) may be performed for each lot of the material containing a fluorine atom. This is because molded articles obtained from the material of the same lot highly possibly have similar performance. It should be noted that the production method of the disclosure enables non-destructive inspection of all molded articles as described above, and thus can sort good molded articles alone regardless of the lot of the material.

The disclosure relates to a method for inspecting a molded article, including a step (A1) of inspecting an internal condition of a molded article having a fluorine content of 30% by mass or more based on image data obtained by imaging the molded article by optical coherence tomography.

The inspection method preferably further includes a step (A2) of determining whether the molded article is a good product or not based on a result of the inspection in the step (A1).

The molded article preferably contains a fluorine-containing polymer.

The molded article preferably contains a melt-fabricable fluororesin.

The molded article is preferably an injection-molded article.

The step (A1) is preferably a step of inspecting cracking and delamination inside the molded article based on the image data.

The disclosure also relates to a method for producing a molded article including:

a step (B1) of molding a material containing a fluorine atom to provide a plurality of molded articles each having a fluorine content of 30% by mass or more;

a step (B2) of selecting at least one molded article from the plurality of molded articles and inspecting an internal condition of the selected molded article based on image data obtained by imaging the selected molded articles by optical coherence tomography; and a step (B3) of sorting a good product from the plurality of molded articles based on a result of the inspection in the step (B2).

The step (B3) preferably includes:

a step (B3-1) of determining whether the molded article inspected in the step (B2) is a good product or not based on the result of the inspection in the step (B2); and a step (B3-2) of sorting a molded article determined as a good product in the step (B3-1) from the plurality of molded articles provided in the step (B1).

EXAMPLES

The disclosure will be described in more detail with reference to examples, but the disclosure is not limited to these examples.

<OCT Imaging>
OCT Device: SweptSys-02 (Available from Systems Engineering Inc.)

OCT swept laser light source: center wavelength 1310 nm, spectral width 100 nm, scan rate 50 kHz, coherence length 12 mm, light output 18 mW (probe end 13 mW)

Imaging Conditions: Brightness 100, Contrast 30

Placement of sample: A notched metal plate was mounted on a goniometer stage available from Sigmakoki Co., Ltd., and a sample was placed such that a portion to be inspected overlapped the notch of the metal plate. FIG. 5 shows a schematic view thereof. A metal plate 22 is placed on a goniometer stage 23 and a sample sheet 24 is placed across the notch of the metal plate 22. Light from a probe 21 is incident on the portion to be inspected of the sample sheet 24.

<MFR>

The melt flow rate (MFR) of each melt-fabricable fluororesin used in the examples was measured at a temperature of 372° C. and a load of 5 kg in conformity with ASTM D 1238.

Example 1

A melt-fabricable fluororesin 1 (TFE/PPVE copolymer, TFE/PPVE=98.5/1.5 (ratio by mole), fluorine content: 76% by mass, MFR: 15 g/10 minutes) was melt-compression-molded at 360° C. to provide a sheet (diameter: 120 mm, thickness: 1.0 mm) as a sample. The sample was subjected to OCT imaging by the aforementioned method with the inclination of the sample being adjusted so that the incident angle $\alpha$ of light relative to the sample was 3 degrees.

Figure 6:
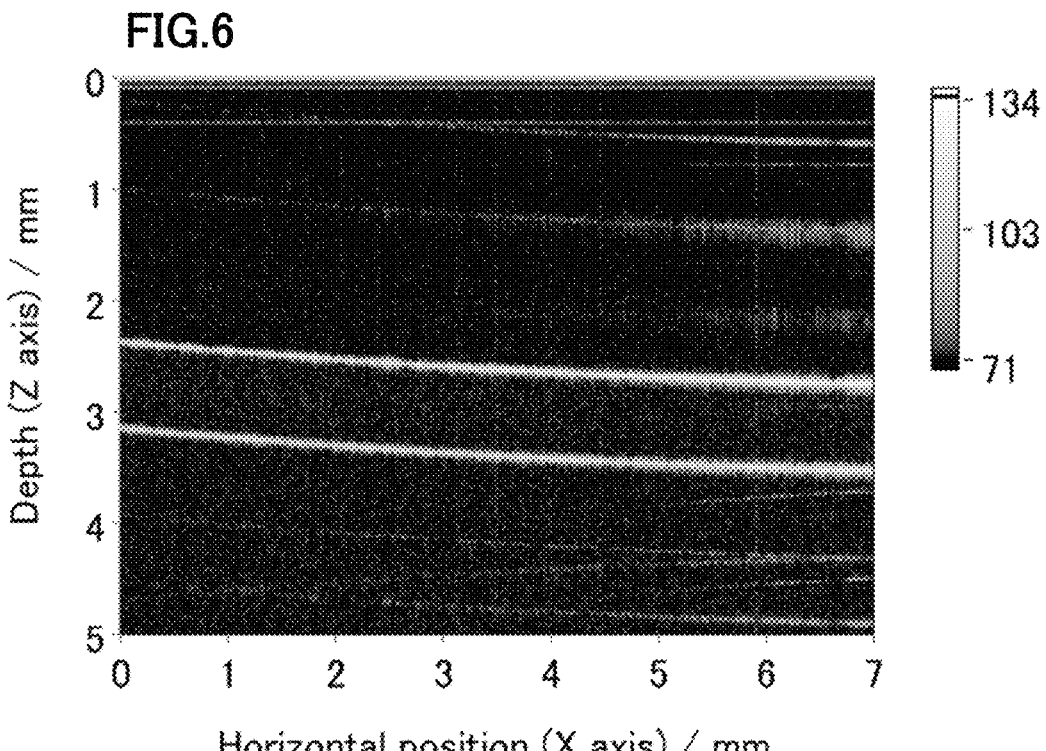
FIG. 6 is an OCT image obtained in Example 1.

The result is shown in FIG. 6. Two clear white lines in the OCT image indicate the front and back surfaces of the sample.

In Examples 1 to 6, in order to confirm the effect of the incident angle, the sample used was a sheet which was in advance checked for the absence of defects such as cracking, delamination, and voids.

Example 2

Figure 7:
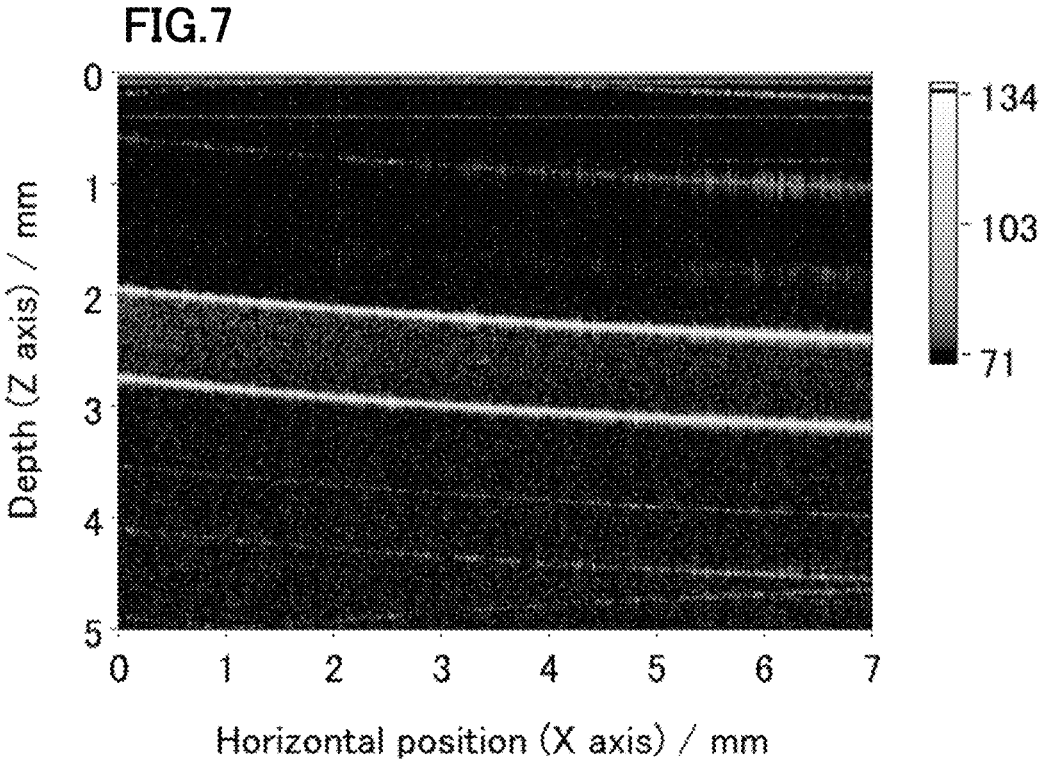
FIG. 7 is an OCT image obtained in Example 2.

OCT imaging was performed as in Example 1 except that the incident angle $\alpha$ of light was changed to 4 degrees. The result is shown in FIG. 7.

Example 3

Figure 8:
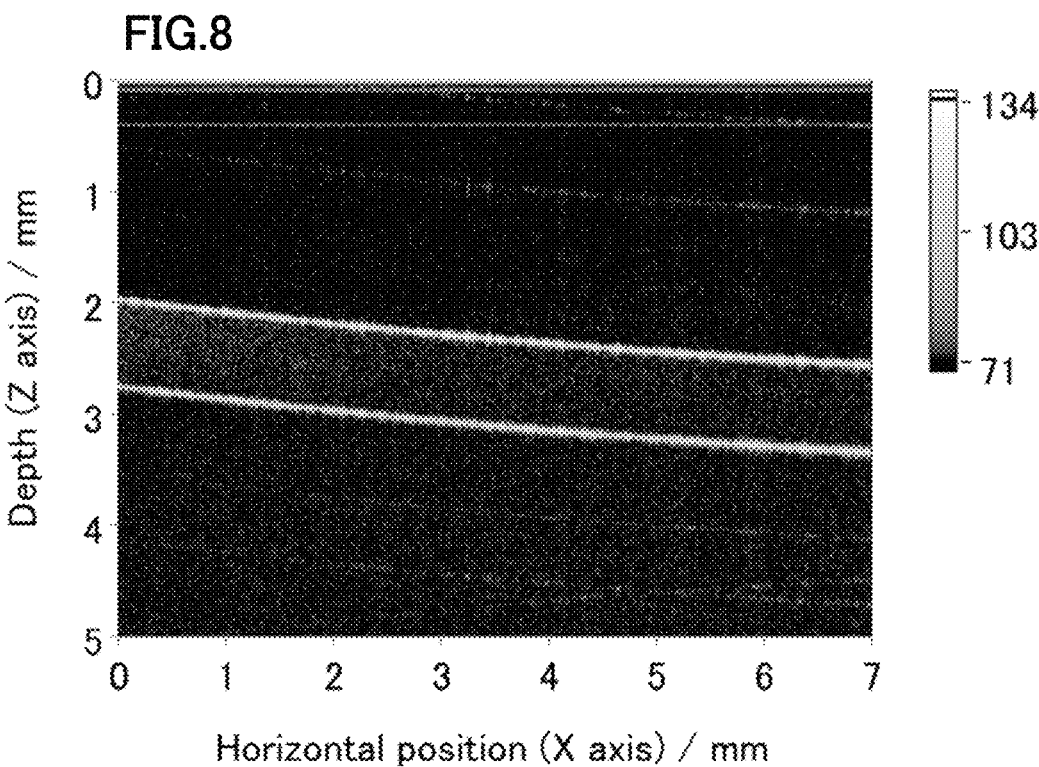
FIG. 8 is an OCT image obtained in Example 3.

OCT imaging was performed as in Example 1 except that the incident angle $\alpha$ of light was changed to 5 degrees. The result is shown in FIG. 8.

Example 4

Figure 9:
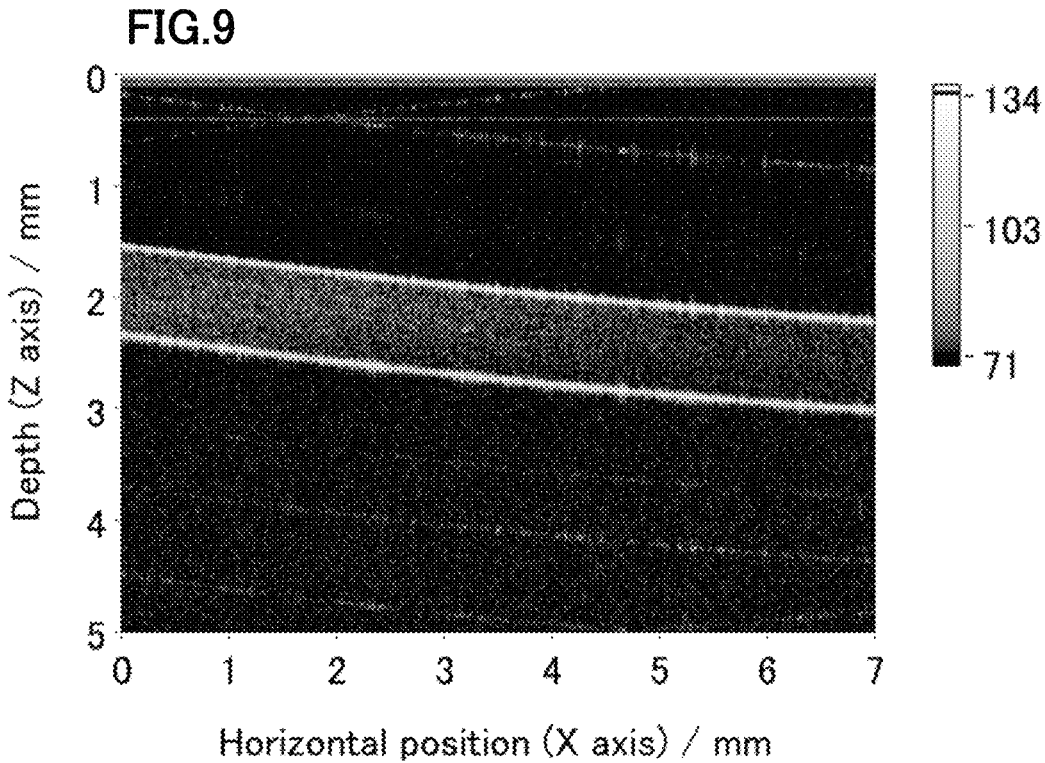
FIG. 9 is an OCT image obtained in Example 4.

OCT imaging was performed as in Example 1 except that the incident angle $\alpha$ of light was changed to 6 degrees. The result is shown in FIG. 9.

Example 5

Figure 10:
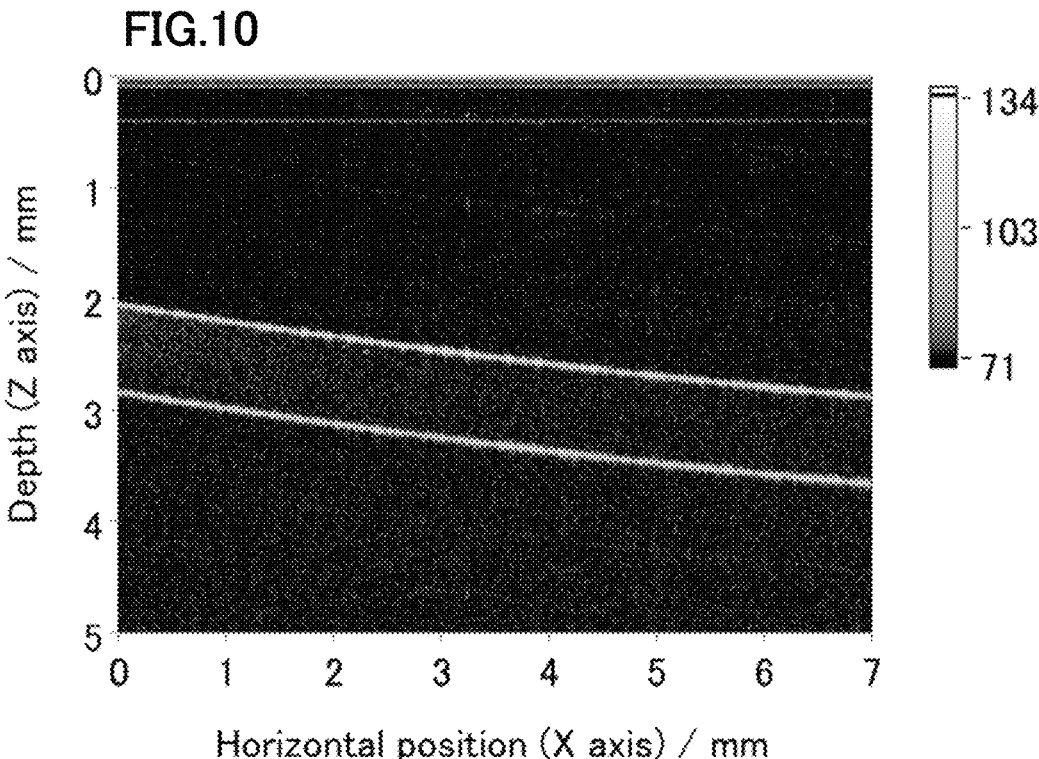
FIG. 10 is an OCT image obtained in Example 5.

OCT imaging was performed as in Example 1 except that the incident angle $\alpha$ of light was changed to 7 degrees. The result is shown in FIG. 10.

Example 6

Figure 11:
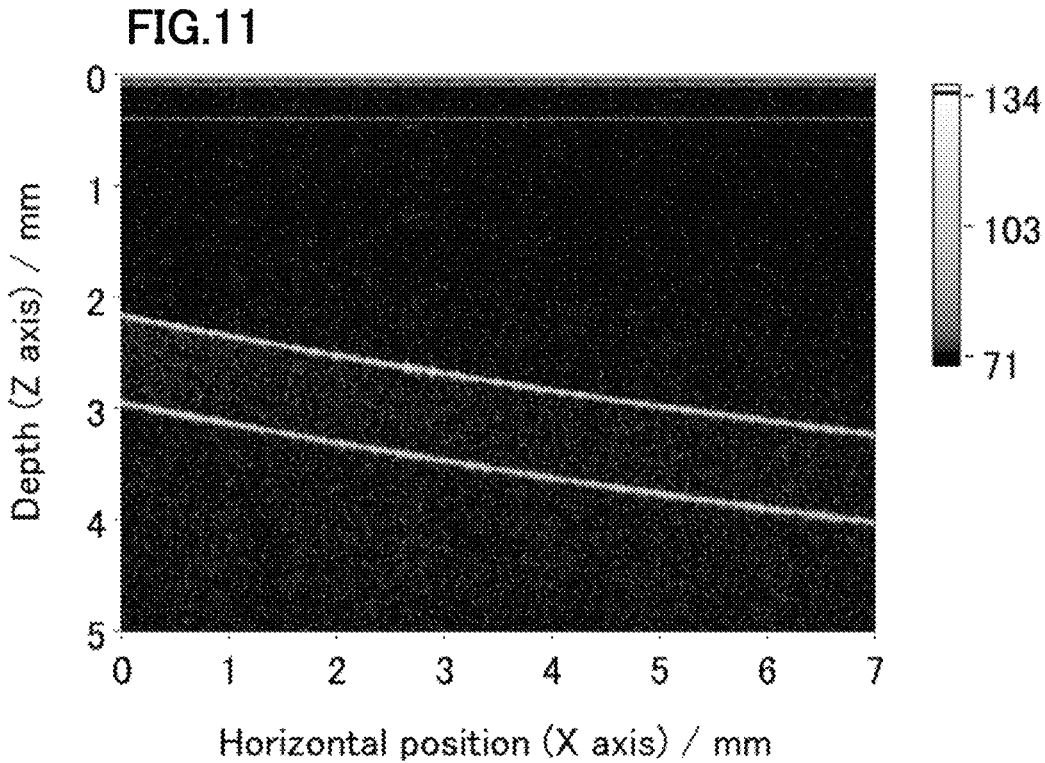
FIG. 11 is an OCT image obtained in Example 6.

OCT imaging was performed as in Example 1 except that the incident angle $\alpha$ of light was changed to 8 degrees. The result is shown in FIG. 11.

In Examples 1 to 4, slight noise was observed in the portion without the sample, while in Examples 5 and 6, noise was hardly observed in both the portion with the sample and the portion without the sample.

Example 7

Figure 12:
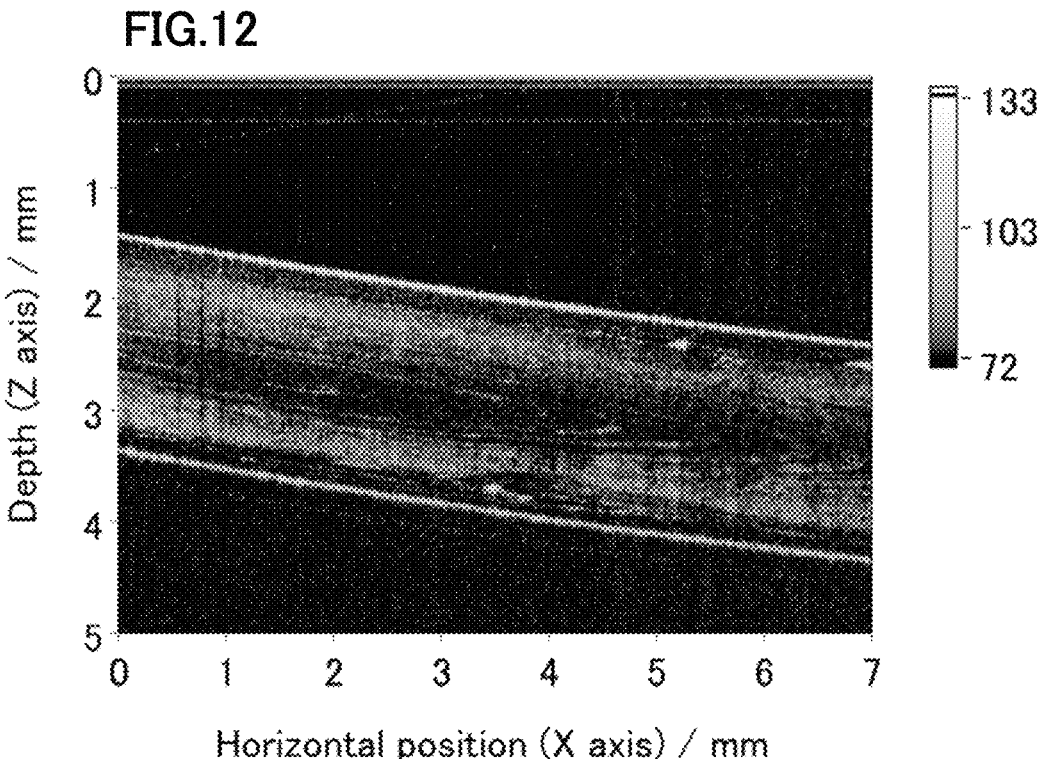
FIG. 12 is an OCT image obtained in Example 7.

A melt-fabricable fluororesin 2 (TFE/PPVE copolymer, TFE/PPVE=98.2/1.8 (ratio by mole), fluorine content: 76% by mass, MFR: 26 g/10 minutes) was injection-molded to provide a sheet-shaped injection-molded article (30 mm×60 mm×1.0 mm thick). This injection-molded article was used as a sample. A portion of the sample 5 mm apart from the gate was subjected to OCT imaging by the aforementioned method with the inclination of the sample being adjusted so that the incident angle $\alpha$ of light relative to the sample was 8 degrees. The result is shown in FIG. 12.

No multiple-reflection noise was observed, but striped signals were observed in the portion corresponding to the cross section of the sample in the image. The sample was sliced and the cross section was observed. As a result, striped cracks were confirmed.

Example 8

Figure 13:
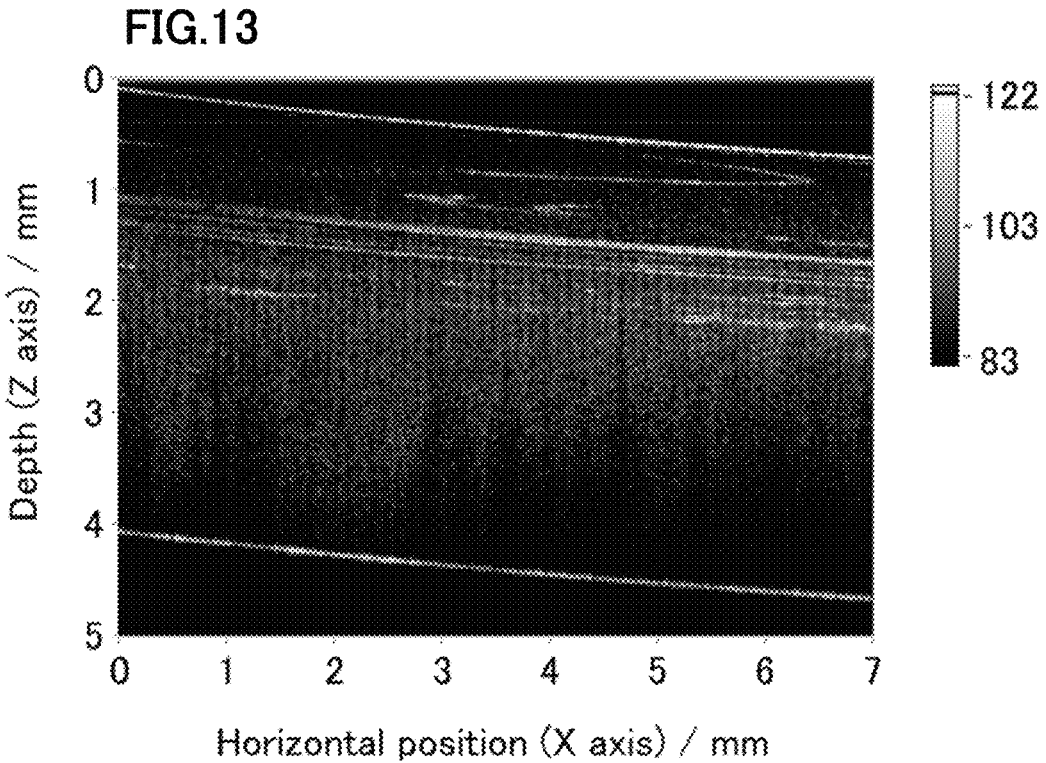
FIG. 13 is an OCT image obtained in Example 8.

A melt-fabricable fluororesin 3 (ethylene/TFE copolymer, ethylene/TFE/perfluoro(1,1,5-trihydro-pentene)=54/44/2 (ratio by mole), fluorine content: 66% by mass, MFR: 16.0 g/10 minutes) was injection-molded to provide a sheet-shaped injection-molded article (130 mm×130 mm×3.0 mm thick). This injection-molded article was used as a sample. A portion of the sample 3 mm apart from the gate was subjected to OCT imaging by the aforementioned method with the inclination of the sample being adjusted so that the incident angle $\alpha$ of light relative to the sample was 8 degrees. The result is shown in FIG. 13.

No multiple-reflection noise was observed, but striped signals were observed in the portion corresponding to the cross section of the sample in the image. The sample was sliced and the cross section was observed. As a result, striped cracks were confirmed.

Example 9

Figure 14:
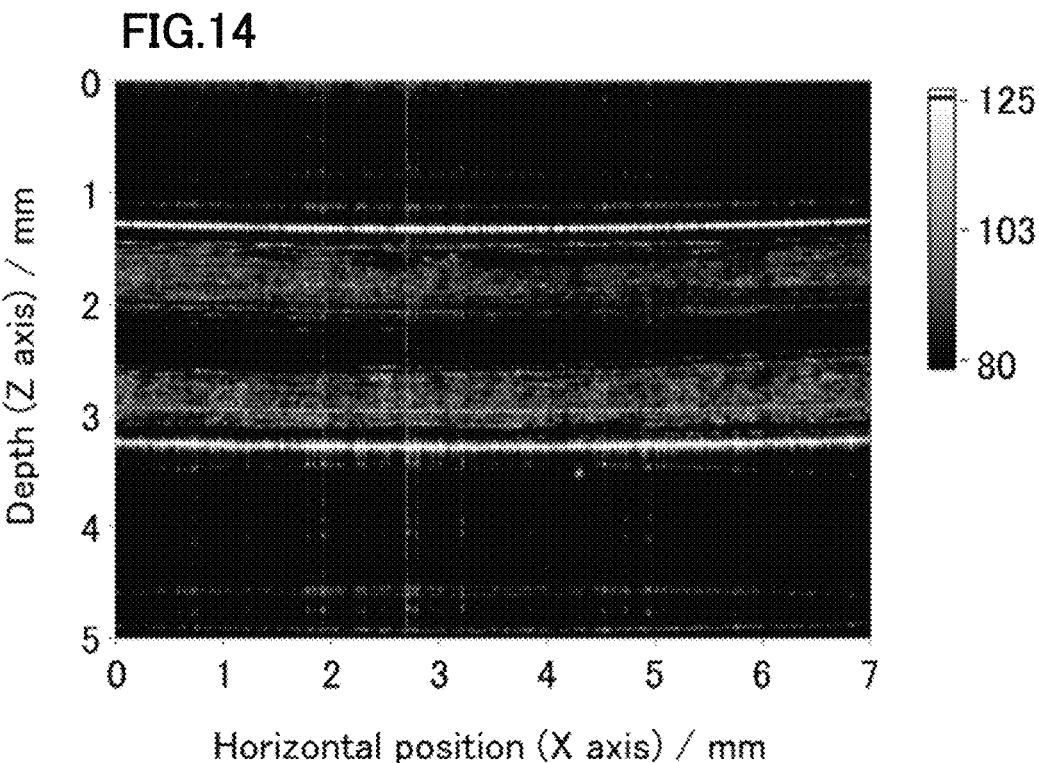
FIG. 14 is an OCT image obtained in Example 9.

The melt-fabricable fluororesin 2 (TFE/PPVE copolymer, TFE/PPVE=98.2/1.8 (ratio by mole), fluorine content: 76% by mass, MFR: 26 g/10 minutes) was injection-molded to provide a sheet-shaped injection-molded article (50 mm×60 mm×2.0 mm thick). This injection-molded article was used as a sample. a portion of the sample 10 mm apart from the gate was subjected to OCT imaging with a 1-mm-thick transparent polyethylene terephthalate (PET) sheet being placed as a filter between the probe and the sample and with the incident angle $\alpha$ of light relative to the sample being set to 0 degrees. The result is shown in FIG. 14.

Example 10

Figure 15:
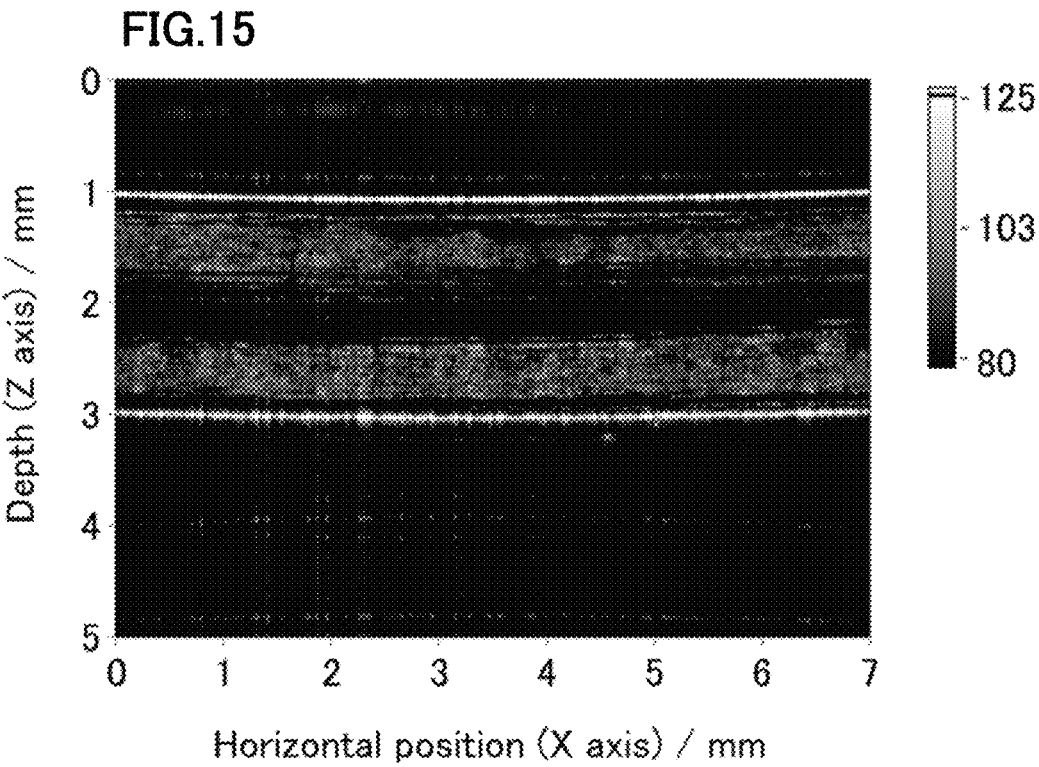
FIG. 15 is an OCT image obtained in Example 10.

OCT imaging was performed as in Example 9 except that the filter used was a 0.5-mm-thick tetrafluoroethylene/perfluoro(alkyl vinyl ether) copolymer (PFA) sheet. The result is shown in FIG. 15.

Example 11

Figure 16:
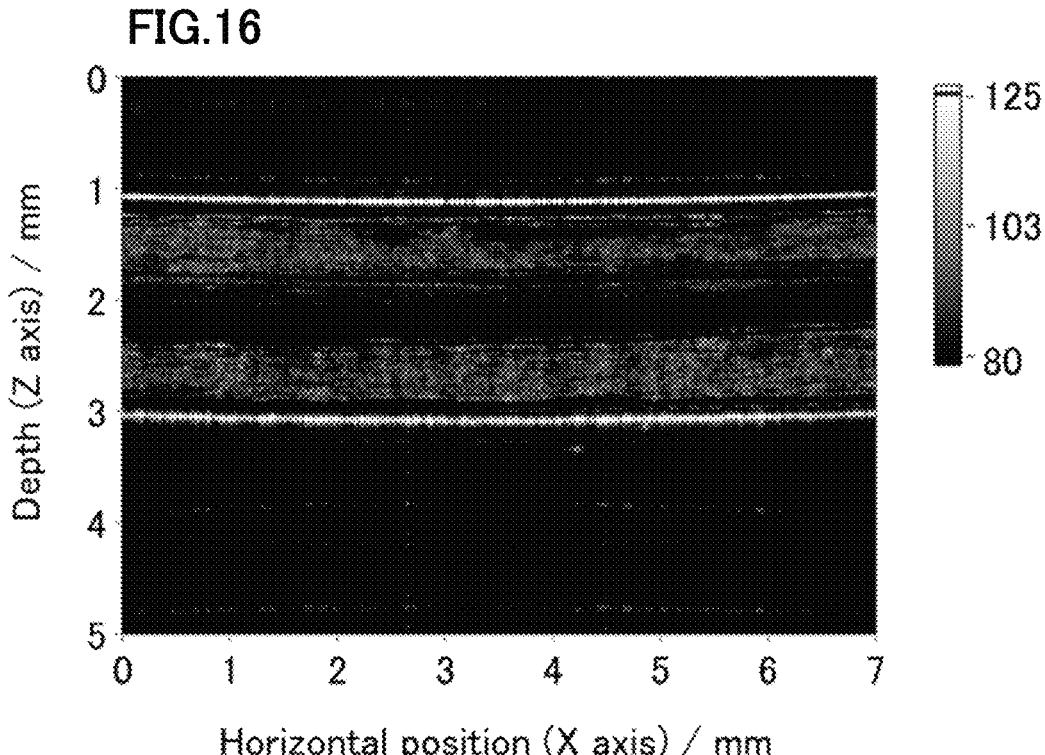
FIG. 16 is an OCT image obtained in Example 11.

OCT imaging was performed as in Example 9 except that the filter used was a 1.0-mm-thick PFA sheet. The result is shown in FIG. 16.

Example 12

Figure 17:
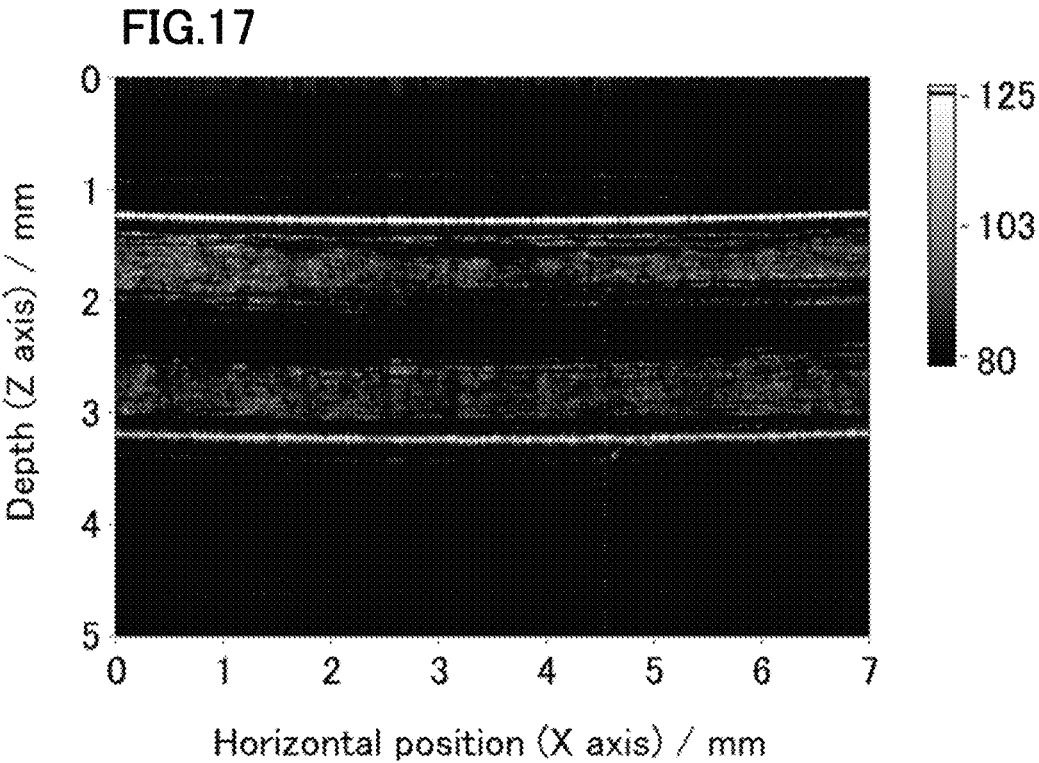
FIG. 17 is an OCT image obtained in Example 12.

OCT imaging was performed as in Example 9 except that the filter used was a stack of two 0.5-mm-thick PFA sheets. The result is shown in FIG. 17.

Example 13

Figure 18:
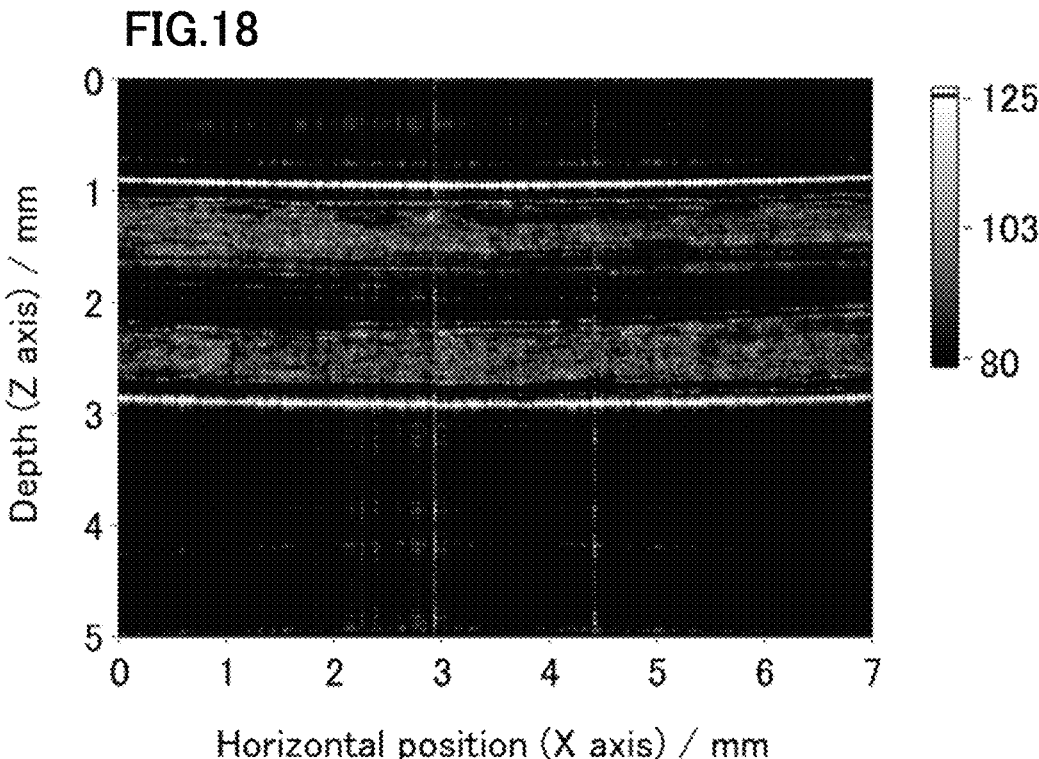
FIG. 18 is an OCT image obtained in Example 13.

OCT imaging was performed as in Example 9 except that the filter used was a 0.2-mm-thick polypropylene (PP) sheet. The result is shown in FIG. 18.

Example 14

Figure 19:
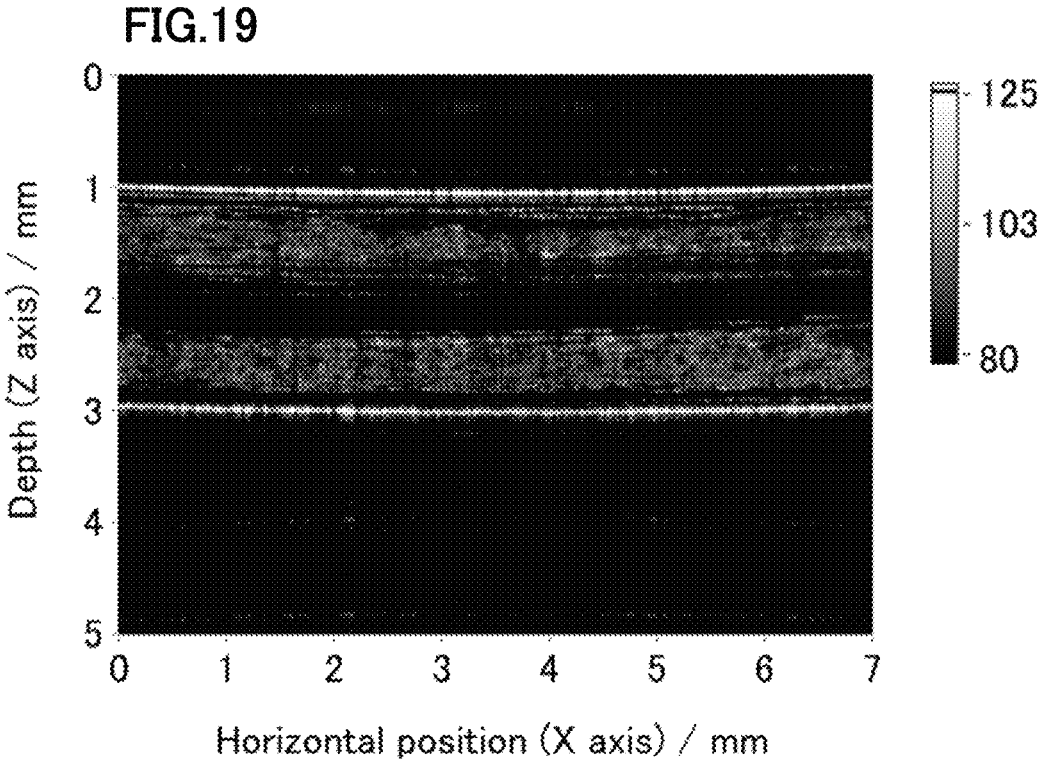
FIG. 19 is an OCT image obtained in Example 14.

OCT imaging was performed as in Example 9 except that the filter used was a stack of four 0.04-mm-thick polyethylene (PE) sheets. The result is shown in FIG. 19.

Example 15

Figure 20:
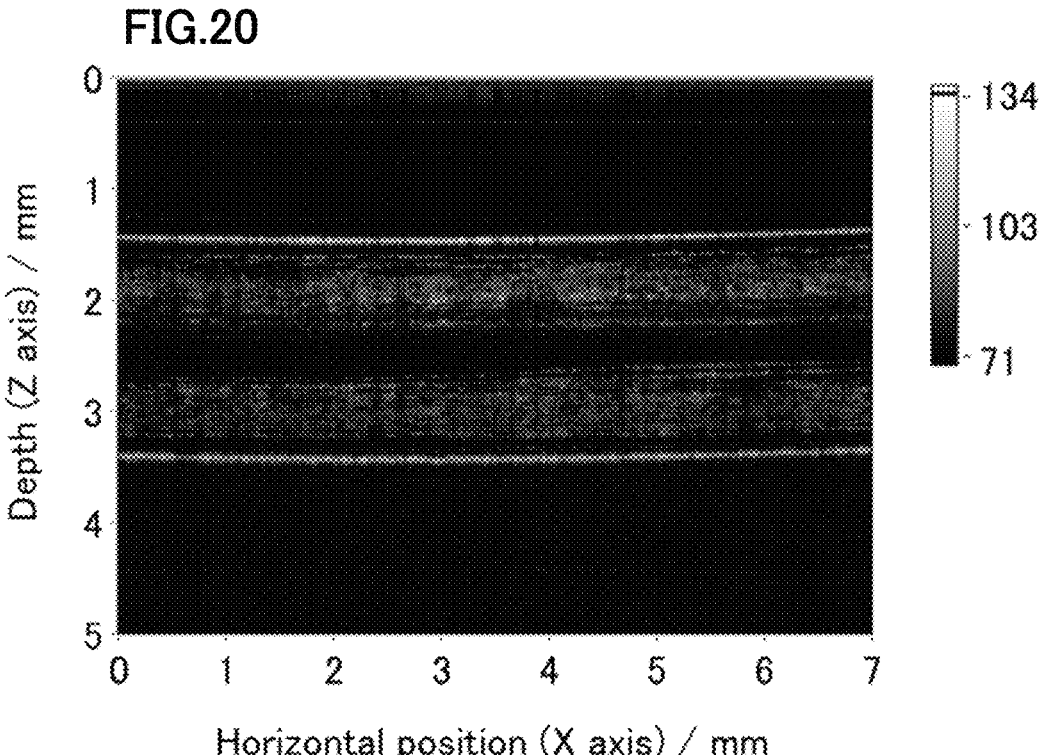
FIG. 20 is an OCT image obtained in Example 15.

OCT imaging was performed as in Example 9 except that the filter used was a 0.1-mm-thick polytetrafluoroethylene (PTFE, TFE homopolymer) sheet. The result is shown in FIG. 20.

Example 16

Figure 21:
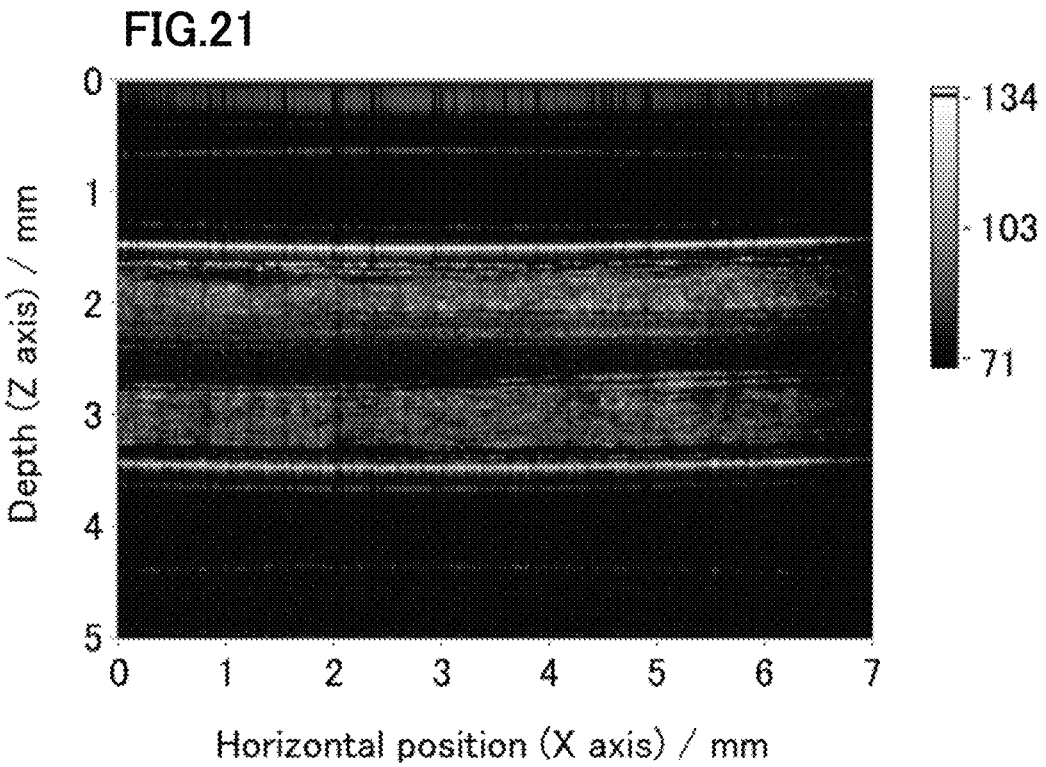
FIG. 21 is an OCT image obtained in Example 16.

OCT imaging was performed as in Example 9 except that the filter used was a 0.1-mm-thick modified polytetrafluoroethylene (modified PTFE) sheet. The result is shown in FIG. 21.

Example 17

Figure 22:
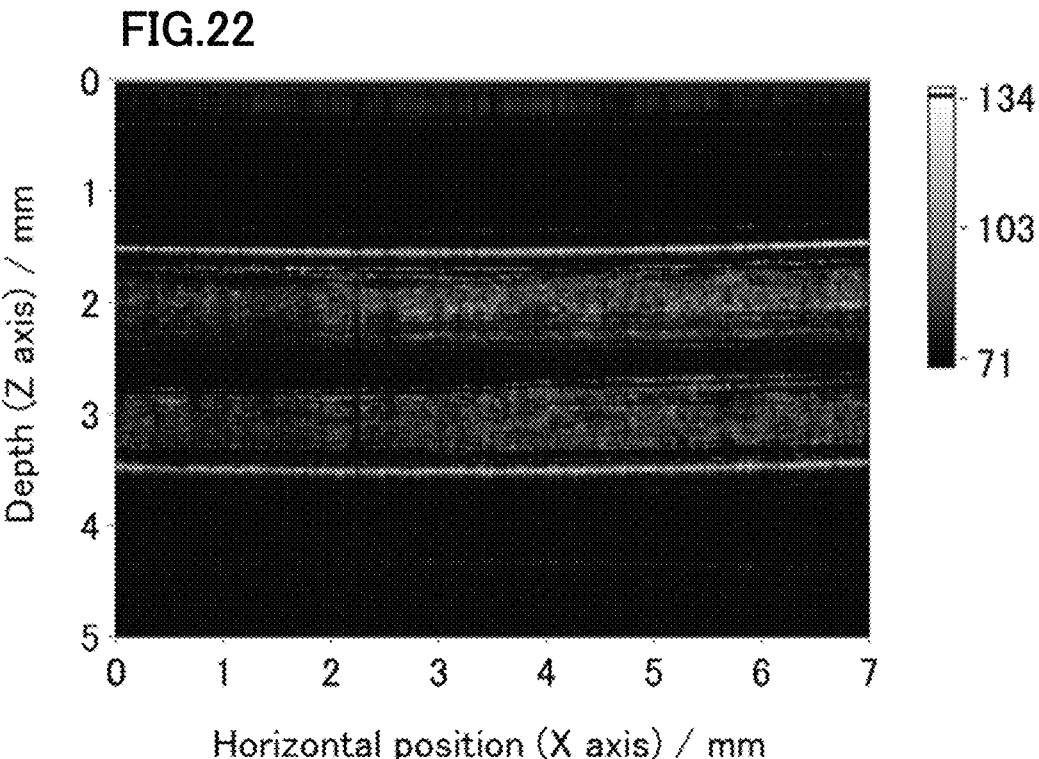
FIG. 22 is an OCT image obtained in Example 17.

OCT imaging was performed as in Example 9 except that the filter used was a stack of two 0.1-mm-thick modified PTFE sheets. The result is shown in FIG. 22.

Example 18

Figure 23:
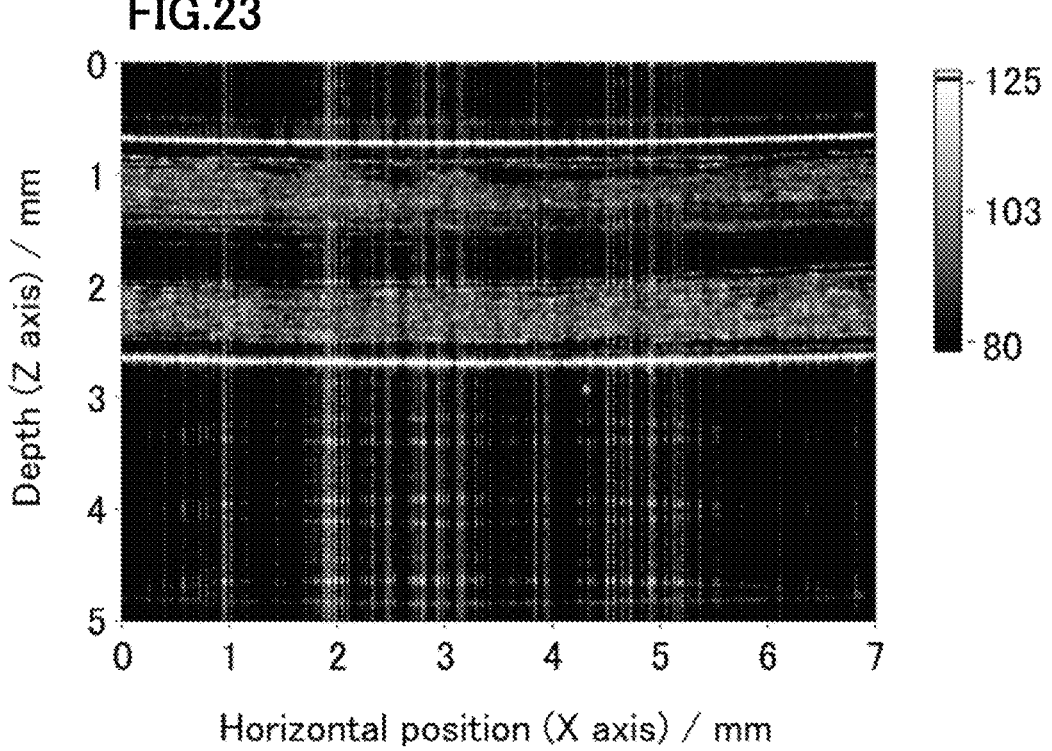
FIG. 23 is an OCT image obtained in Example 18.

OCT imaging was performed as in Example 9 except that no filter was used. The result is shown in FIG. 23.

In Examples 9 to 17 where the filter(s) was/were used, multiple-reflection noise was reduced in comparison to Example 18 where no filter was used. In Examples 10 to 12 and 14 to 17 where the PFA, PE, or PTFE filter(s) was/were used, the effect of reducing multiple-reflection noise was particularly significant. Also, in Examples 15 to 17 where the PTFE filter(s) was/were used, especially in Examples 16 and 17 where the modified PTFE filter(s) was/were used, multiple-reflection noise was sufficiently reduced while the resolution of the signal of the sample remained high.

REFERENCE SIGNS LIST

10: OCT device
11: light source
12: beam splitter
13: reference mirror
14: photodetector
15: sample (molded article)
16, 16': molded article
17: stage
18: probe
19: spacer
21: probe
22: metal plate

23: goniometer stage
24: sample sheet

What is claimed is:

1. A method for inspecting a molded article, comprising:
a step (A1) of inspecting an internal condition of a molded article having a fluorine content of 30% by mass or more based on image data obtained by imaging the molded article by optical coherence tomography (OCT),
wherein in the OCT imaging, light from a light source of an OCT device has an incident angle $\alpha$ of 5 to 10 degrees relative to the molded article,
wherein the incident angle $\alpha$ is the angle formed by the incident direction of the light and a perpendicular to a surface of the molded article, and
wherein the molded article has a single-layer structure.

2. The inspection method according to claim 1, further comprising a step (A2) of determining whether the molded article is a good product or not based on a result of the inspection in the step (A1).

3. The inspection method according to claim 1,
wherein the molded article contains a fluorine-containing polymer.

4. The inspection method according to claim 1,
wherein the molded article contains a melt-fabricable fluororesin.

5. The inspection method according to claim 1,
wherein the molded article is an injection-molded article.

6. The inspection method according to claim 1,
wherein the step (A1) is a step of inspecting cracking and delamination inside the molded article based on the image data.

7. A method for producing a molded article comprising:
a step (B1) of molding a material containing a fluorine atom to provide a plurality of molded articles each having a fluorine content of 30% by mass or more;
a step (B2) of selecting at least one molded article from the plurality of molded articles and inspecting an internal condition of the selected molded article based on image data obtained by imaging the selected molded article by optical coherence tomography (OCT); and
a step (B3) of sorting a good product from the plurality of molded articles based on a result of the inspection in the step (B2),
wherein in the OCT imaging, light from a light source of an OCT device has an incident angle $\alpha$ of 5 to 10 degrees relative to the molded article,
wherein the incident angle $\alpha$ is the angle formed by the incident direction of the light and a perpendicular to a surface of the molded article, and
wherein the molded article has a single-layer structure.

8. The method for producing a molded article according to claim 7,
wherein the step (B3) includes:
a step (B3-1) of determining whether the molded article inspected in the step (B2) is a good product or not based on the result of the inspection in the step (B2); and
a step (B3-2) of sorting a molded article determined as a good product in the step (B3-1) from the plurality of molded articles provided in the step (B1).

9. A method for inspecting a molded article, comprising:
a step (A1) of inspecting an internal condition of a molded article having a fluorine content of 30% by mass or more based on image data obtained by imaging the molded article by optical coherence tomography (OCT), wherein in the OCT imaging, a filter containing a crystalline polymer is provided between a light source of an OCT device and the molded article, wherein the crystalline polymer is at least one selected from the group consisting of a tetrafluoroethylene/ perfluoro(alkyl vinyl ether) copolymer, and a tetrafluoroethylene/hexafluoropropylene copolymer.

10. A method for producing a molded article comprising:

a step (B1) of molding a material containing a fluorine atom to provide a plurality of molded articles each having a fluorine content of 30% by mass or more;

a step (B2) of selecting at least one molded article from the plurality of molded articles and inspecting an internal condition of the selected molded article based on image data obtained by imaging the selected molded article by optical coherence tomography (OCT); and a step (B3) of sorting a good product from the plurality of molded articles based on a result of the inspection in the step (B2), wherein in the OCT imaging, a filter containing a crystalline polymer is provided between a light source of an OCT device and the molded article, wherein the crystalline polymer is at least one selected from the group consisting of a tetrafluoroethylene/ perfluoro(alkyl vinyl ether) copolymer, and a tetrafluoroethylene/hexafluoropropylene copolymer.

* * * * *